United States Patent [19]
Ban et al.

[11] 3,795,277
[45] Mar. 5, 1974

[54] METHOD FOR IMPROVEMENT OF PETROLEUM OUTPUT PARTICULARLY FROM STORAGE STRATA CONTAINING CONCOMITANTLY PETROLEUM

[75] Inventors: Akos Ban; Sandor Nagy, both of Budapest; Valer Balint, Nagykanizsa, all of Hungary

[73] Assignee: Koolaj-es Gazipari Tervezo Vallalat, Budapest, Hungary

[22] Filed: Oct. 28, 1971

[21] Appl. No.: 193,429

[52] U.S. Cl. ............................... 166/265, 166/274
[51] Int. Cl. ........................................... E21b 43/22
[58] Field of Search ............... 166/273–275, 305 R, 166/307, 308, 265, 266

[56] References Cited
UNITED STATES PATENTS

| | | | |
|---|---|---|---|
| 3,464,492 | 9/1969 | Friedman | 166/274 X |
| 3,392,782 | 7/1968 | Ferrell et al. | 166/275 |
| 2,776,714 | 1/1957 | Stanclift Jr. et al. | 166/305 R |
| 3,101,781 | 8/1963 | Connally, Jr. | 166/273 |
| 3,123,136 | 3/1964 | Sharp | 166/273 |
| 3,138,204 | 6/1964 | Richardson | 166/305 R |
| 3,303,878 | 2/1967 | Connally, Jr. | 166/273 |
| 3,384,177 | 5/1968 | Day et al. | 166/307 |

Primary Examiner—Stephen J. Novosad

[57] ABSTRACT

Ammonia or an aqueous solution thereof is injected into geological strata to improve the petroleum output thereof, more particularly where the strata contain both petroleum and natural gas. This will not only result in a substantially complete expulsion of liquid hydrocarbons even from microporous strata, but the invention also provides a sealing fluid at the interface between the liquid and gas phases in the strata containing both liquid and gaseous hydrocarbons.

8 Claims, No Drawings

METHOD FOR IMPROVEMENT OF PETROLEUM OUTPUT PARTICULARLY FROM STORAGE STRATA CONTAINING CONCOMITANTLY PETROLEUM

The drop in the petroleum production of oil wells, as well as the low oil output achieved by primary stratum energy has necessitated in petroleum production the development of a great number of secondary and tertiary operations. These operations essentially involve the injection of various materials (water, hydrocarbon gas or carbon dioxide) into the opened stratum at some distance from the location of production, accelerating thereby the flow of liquid hydrocarbons in the direction of the well bottom.

With similar aim in mind experiments have been carried out with setting on fire the hydrocarbons saturated in the stratum at some distant point of the stratum and also with the introduction of various microorganism strains capable of displacing the hydrocarbons in the stratum.

These procedures are, however, only partially successful.

The displacement method using injected water (by re-injecting the stratum water or injecting foreign water into the stratum) has the drawback that hydrocarbon is left behind in microporous rocks in the form of inclusions, since water has no significantly higher activity with respect to the rocks than to the hydrocarbons, so that it is incapable of replacing the hydrocarbons in the micropores. The situation is similar when hydrocarbon gases are injected into the stratum, furthermore, hydrocarbon gases represent a considerable value, so that their return into the stratum is essentially a loss fuel values.

Under the pressure and temperature conditions prevailing in the petroleum strata carbon dioxide is generally above its critical point where petroleum readily dissolves carbon dioxide so that the latter will have a favorable displacement effect. Nevertheless, the carbon dioxide method too has its disadvantages. As a result of the interaction between petroleum and carbon dioxide, asphaltenes and resins precipitate onto the pores further deteriorating seapage properties of the stratum. Due to the surface effects in the porous storage a complete rupture of the petroleum membrane cannot be accomplished by injecting carbon dioxide into the stratum and the displacement of the oil is also only partially realized. In the range of saturation the specific gravity of the aqueous solution of carbon dioxide is higher than that of water, so that it will separate from the hydrocarbons having a specific gravity lower than water. Carbon dioxide is soluble in water only to a limited extent and has, because of its acid pH value, a low desorption effect on the resins and will dissolve the resinous substances only to a slight extent. Extensive use of thermal methods in oil production is hindered by the composition of the oil and the great depth of the oil-bearing strata. The growth of micro-organism strains in the subterranean storage strata depends on innumerable and unpredictable conditions, so that the result of this method is rather uncertain.

Introduction of gas into the stratum, similarly into strata containing both petroleum and natural gas, results in the formation of so-called gas-caps when gases with specific gravities lower than those of liquid hydrocarbons accumulate in the vaults of the hydrocarbon storage stratum. The presence of gases in the form of such gas-caps has an unfavorable influence on stratum pressure and in addition the gas may break through the so-called macrocracks which are longer and have a larger diameter and are in the rocks, directly through to the well bottom which will have an extremely unfavorable effect on the production conditions of the well.

In order to avoid this latter phenomenon it has been attempted to produce a liquid film consisting of a sealing fluid on the boundary layer between the liquid and gaseous hydrocarbons in the gas-cap. To achieve this objective gases being in the liquid state under the conditions of stratum pressure and temperatures (propane, butane) were used which, as aforesaid, involves a loss of fuel values. There is no possibility of using water, since it would be complicated to produce a sealing liquid on top of some hydrocarbons with a specific gravity lower than that of water.

The present invention intends to help to remove these disadvantages.

The present invention relates to an oil production method which is suitable on the one hand for the complete expulsion of liquid hydrocarbons from microporous strata as well as, for the formation of a relatively cheap sealing fluid, by using the same materials and procedures for both of these purposes, without the loss of any fuel values and providing for sufficient safety at the interface of the gas phase and the liquid phase in strata producing both liquid and gaseous hydrocarbons.

We have established in the course of our experiments that the aqueous solution of ammonia forms a sufficiently stable alkaline chemosorptive compound whose specific gravity is lower than that of water and can be adjusted by means of changing the ratio of the components to any arbitrarily chosen value, its critical temperature is sufficiently high, remains generally in the liquid state under the conditions of stratum pressure and stratum temperature and is in all proportions miscible with water, while its adsorption and desorption properties are considerably better than those of carbon dioxide. Consequently, both ammonia and its aqueous solution are equally suitable to expel the liquid hydrocarbons from microporous storage strata and, in addition, to form on the interface of liquid and gaseous hydrocarbons a sealing fluid of appropriate properties.

One of the possible embodiments of the method in accordance with the invention is as follows:

Injection wells are established in appropriate positions in the known manner, in the stratum opened for the recovery of crude petroleum. The plant to prepare the ammonia solution can suitably be situated in the vicinity of the injection wells and shall preferably contain equipment for the treatment of water, an agitator, and filtration and storage tanks. After production has been started the ammonia solution of appropriate mixing ratio is injected through the injection wells into the stratum in a quantity corresponding to 10 to 20 per cent of the pore volume to be flooded. After the injection of said solution the addition of the ammonia solution is stopped and by injecting pure water through the injection well the formed ammonia plug is driven forward in the stratum, in the direction of the production well.

By adjusting the amount of applied ammonia gas one can produce aqueous solutions with specific gravities that are lower, higher or equal to the specific gravities of the liquid hydrocarbons saturated in the stratum.

The concentration of the solution can range from 4.5 to 400, suitably 10 to 300, g per liter. With the help of the solution; the displacement can be performed by progressing from the lower boundary of the stratum towards the upper boundary thereof (with a solution having a specific gravity higher than that of the liquid hydrocarbon), from the upper boundary of the stratum progressing towards the lower boundary of the stratum (with a solution having a lower specific gravity than the liquid hydrocarbon) or by the overall effect of employing the two solutions and progressing simultaneously in both directions.

According to another possible embodiment of the invention liquefied ammonia is injected in the described manner into the stratum, then the plug is formed in this way is driven on by the injection of water in the described manner. In this way a quite radical effect can be achieved.

A further possible embodiment of the method in accordance with the invention relates to the formation of the sealing fluid. In case of strata containing both liquid and gaseous hydrocarbons, by an appropriate concentration of the ammonia gas (by the addition to 4.5 to 400, suitably 10–300, g per litre of ammonia gas) an aqueous solution is prepared with a specific gravity which approximates the specific gravity of the liquid hydrocarbons saturated in the stratum, but is lower than the latter. This solution is injected by means of an appropriately situated injection well into the liquid in the gas-cap in which, due to its specific gravity, the solution is situated on the surface, thereby separating the gas from the liquid hydrocarbon, and in addition prevents the dissolution of hydrocarbon gas in the liquid hydrocarbon.

In the course of production from the stratum, under the effect of the pressure of the gas-cap the ammoniacal water penetrates into the stratum where it replaces the petroleum which was removed by desorption and, due to its above described adsorption property drives, the residual petroleum from the stratum in the direction of the production well.

Application of the embodiment of the method in accordance with the invention is suitable to improve considerably the specific output of petroleum storing strata and in addition is suitable to bring about the successful operation of bituminous petroleum sites with high aromatic and high resin contents (e.g. the oil sites at Nagylengyel and Barabasszeg) moreover to realize the secondary exploitation of petroleum strata which had been exploited first by some known procedure.

The method may be combined with the carbon dioxide expulsion method.

The ammonia and its aqueous solution can be separated from the petroleum ascending in the production well by means of separators and reused after appropriate concentration.

What we claim is:

1. In a process for increasing the specific yield of porous oil-bearing strata, particularly of strata which contain highly aromatic and highly resinuous bituminous oils and gases and of strata otherwise substantially depleted strata, the improvement which comprises forming a layer of ammoniacal sealing fluid by injecting through an injection well into the porous strata, into the gas cap, or into the vicinity of the gas cap ammonia or an aqueous solution thereof, whereby the ammoniacal sealing fluid drives out the oil from the strata more efficiently due to the adsorption-desorption characteristics of the ammoniacal fluid.

2. The process of claim 1, wherein the ammoniacal sealing fluid has a lower specific gravity than that of the crude oil in the strata, whereby the ammoniacal sealing fluid separates the natural gases from the oil and thus prevents dissolution of the gases in the oil, and whereby due to the pressure of the gases in the gas cap the ammoniacal sealing fluid sweeps the oil from the oil-bearing strata in a downward direction towards the bottom of these strata.

3. The process of claim 1, wherein the ammoniacal sealing fluid has a higher specific gravity than that of the crude oil in the strata, and water is injected into the bottom area of the strata, whereby the ammoniacal sealing fluid sweeps the oil-bearing strata from the bottom upward.

4. The process of claim 1, wherein the sealing fluid is injected towards the top and the bottom of the oil-bearing strata, whereby the oil in the strata is swept out from both directions.

5. The process of claim 2, wherein an aqueous ammonia solution is employed in a concentration of from about 10g to about 400 g liquid ammonia per liter of water.

6. The process of claim 3, wherein an aqueous solution is employed in a concentration of from about 4.5 g to about 300 g liquid ammonia per liter of water.

7. The process of claim 6, wherein the amount of the aqueous solution corresponds to from about 10 percent to about 20 percent of the volume of the porosity of the oil-bearing strata.

8. The process of claim 1, further comprising recovering ammonia from the crude oil obtained from the oil-bearing strata.

* * * * *